(12) United States Patent
Bradley et al.

(10) Patent No.: US 7,559,391 B2
(45) Date of Patent: Jul. 14, 2009

(54) ENGINE COMPARTMENT TEMPERATURE SENSITIVE LOUVERS

(75) Inventors: James C. Bradley, New Haven, IN (US); Scott A. Wooldridge, Fort Wayne, IN (US); Rodney J. Klinger, Fort Wayne, IN (US); Joseph T. Penaloza, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 535 days.

(21) Appl. No.: 11/364,520

(22) Filed: Feb. 28, 2006

(65) Prior Publication Data

US 2007/0199751 A1 Aug. 30, 2007

(51) Int. Cl.
    *B60K 11/04* (2006.01)
(52) U.S. Cl. ........................................ 180/68.1
(58) Field of Classification Search ................ 180/68.1, 180/68.2, 68.3, 68.6, 69.24; 296/193.1; 236/49.1, 236/49.2, 49.5
    See application file for complete search history.

(56) References Cited

U.S. PATENT DOCUMENTS

| 1,265,469 | A | | 5/1918 | Mallory |
| 3,701,063 | A | * | 10/1972 | Clausse ............ 335/146 |
| 3,976,540 | A | | 8/1976 | Sowa |
| 4,328,927 | A | | 5/1982 | McSwain |
| 4,753,288 | A | * | 6/1988 | Harvey ............ 165/98 |
| 4,924,826 | A | | 5/1990 | Vinson |
| 4,962,882 | A | | 10/1990 | Sarazen, Jr. et al. |
| 5,404,980 | A | | 4/1995 | Shafer |
| 5,794,733 | A | * | 8/1998 | Stosel et al. ........ 180/68.1 |
| 5,950,753 | A | | 9/1999 | Muldoon et al. |
| 5,984,196 | A | * | 11/1999 | Godsey et al. ....... 236/49.5 |
| 6,147,791 | A | | 11/2000 | Sheridon |
| 6,180,928 | B1 | * | 1/2001 | Garrigus ............ 219/491 |
| 6,330,155 | B1 | * | 12/2001 | Remsburg ........... 361/695 |
| 6,439,328 | B1 | * | 8/2002 | Vaillancourt et al. .... 180/68.1 |
| 6,567,259 | B2 | | 5/2003 | Stevenson et al. |
| 6,910,340 | B2 | * | 6/2005 | Nowak et al. .......... 62/115 |
| 2008/0248739 | A1 | * | 10/2008 | Carlson et al. ....... 454/369 |

FOREIGN PATENT DOCUMENTS

EP 0 919 721 A3 6/1999

OTHER PUBLICATIONS

U.S. Appl. No. 11/249,000, filed Oct. 12, 2005, Bradley et al.

* cited by examiner

*Primary Examiner*—Frank B Vanaman
(74) *Attorney, Agent, or Firm*—Jeffrey P. Calfa; Mark C. Bach

(57) ABSTRACT

A passive louver system providing supplemental and localized cooling for an engine compartment is implemented using magnetic catches for opening and closing of the louvers.

12 Claims, 5 Drawing Sheets

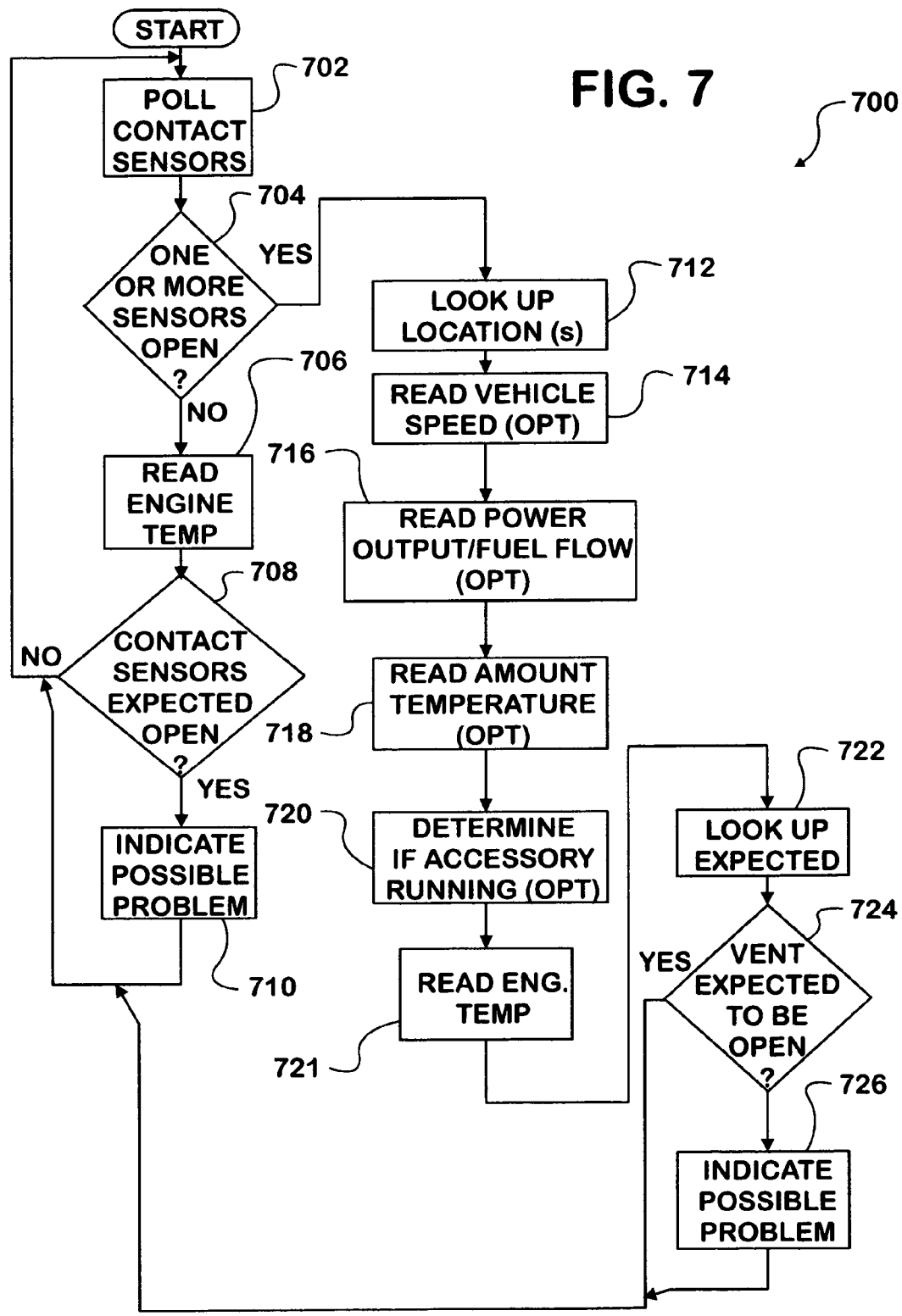

ENGINE COMPARTMENT TEMPERATURE SENSITIVE LOUVERS

BACKGROUND OF THE INVENTION

1. Technical Field

The present invention relates generally to louvers used to control engine compartment ventilation for cooling of the compartment on a motor vehicle.

2. Description of the Problem

Elevated engine compartment air temperatures on motor vehicles have been a design issue essentially since the introduction of internal combustion engines to motor vehicles. The problem has not abated, but become worse, in recent years. This stems in part from the increasing use of exhaust gas recirculation and catalytic converters to reduce exhaust emissions. It also results from the addition of vehicle accessories such as air conditioning. Higher underhood air temperature drives component material selection, cooling system capacity and other design considerations, all of which can add to expense and vehicle complexity. Currently, the problem is solved by the addition of cooling system capacity and heavy reliance on active monitoring. Adding cooling capacity requires more space under the hood. Louver systems have also long been used to control air flow through the engine compartment to aid cooling. Increased fan speed has been used to increase air flow through the engine compartment and under the cab. Heat shields have been used to protect temperature sensitive areas.

It would be advantageous to simplify engine compartment cooling by limiting the need for human or control system intervention while, at the same time, taking advantage of monitoring of operation of a passive cooling system.

SUMMARY OF THE INVENTION

The invention provides a plurality of fins or louvers that are located strategically through a vehicle body, including the hood, adjacent the vehicle's engine compartment. As the temperatures under the hood locally approach critical temperatures that could damage adjacent systems and sub-systems, the fins open promoting air circulation through the engine compartment adjacent the critical area thereby releasing heated air into the atmosphere. Control of the fins' position is local and relatively passive.

Fin position is controlled through control of magnetic attraction between the fin and the hood or body. Fin and hood are each equipped with magnets with their poles oriented to draw the fin toward the hood. Magnetic closure occurs when a catch made of material with good magnetic susceptibility, but a low Curie point, is cool enough to transmit magnetic flux between the permanent magnets. The magnetic catch is located between permanent magnets affixed to the hood and the fin. As local engine compartment temperature rises and the magnetic catch loses magnetic susceptibility a spring urges the fin to an open position. The spring is preferably internal to the fin or an integral part of the fin. The fin may rotate on a pivot though this is not the preferred arrangement. The fin is inherently limited in travel, or subject to an external travel limiting structure, allowing the magnetic attraction to close the fin once the catch regains magnetic susceptibility. The fin spring may be a bimetallic structure which urges the fin open with increasing force as local temperature climbs and can be designed to retract the fin to a closed position at low temperatures.

Advantageously, little or no active control intervention is required to implement this system. In one embodiment the system appears completely passive to the vehicle's control systems. This does not prevent monitoring of the louvers/fins by the control system, which may be done to trigger active cooling system response to louver movement or to signal faults. Active cooling system components that can be integrated into the system are; fan speeds, logic for activating the fan to exhaust the air and engine controller activity that would provide indications of an upcoming engine event that would generate increased heat. Where louver movement appears abnormal in view of measured engine temperature, an indication may be provided an operator.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 7 is a flow chart illustrating a possible control method using louver position as a control input.

DETAILED DESCRIPTION OF THE INVENTION

Figure 1:
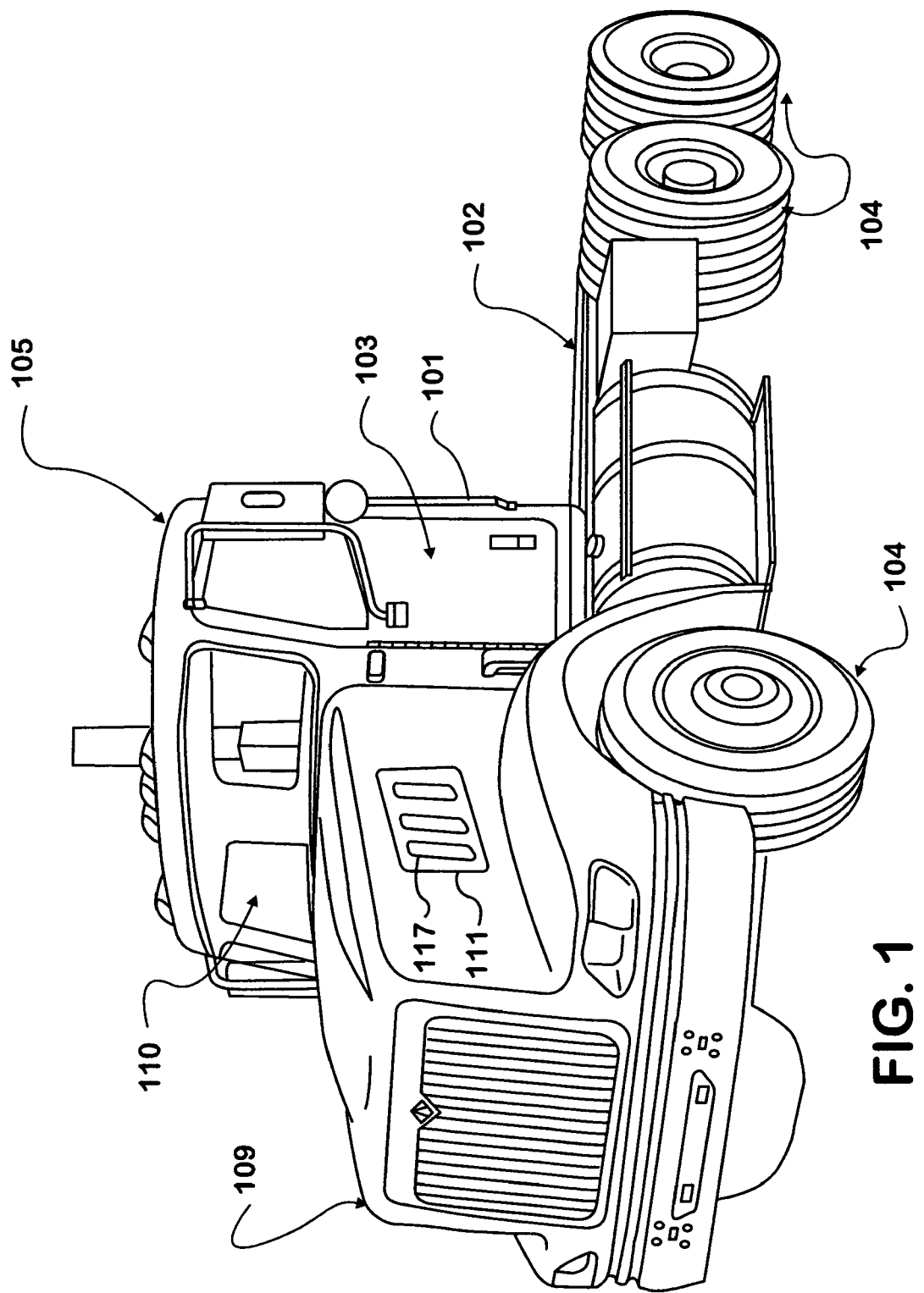
FIG. 1 is a perspective view of a truck tractor incorporating the present invention.

Referring to the drawings and in particular referring to FIG. 1 a truck tractor 101 is illustrated, conventionally built as a body 105 on a chassis 102. A cab is accessed through a door 103 and a windshield 110 allows easy viewing forward from the cab. Truck tractor rolls on wheels 104 and includes an engine (not shown) enclosed under portions of the body including a hood 109. An array 111 of louvers 117 is shown along one side of body 105 adjacent the engine compartment.

Figure 2:
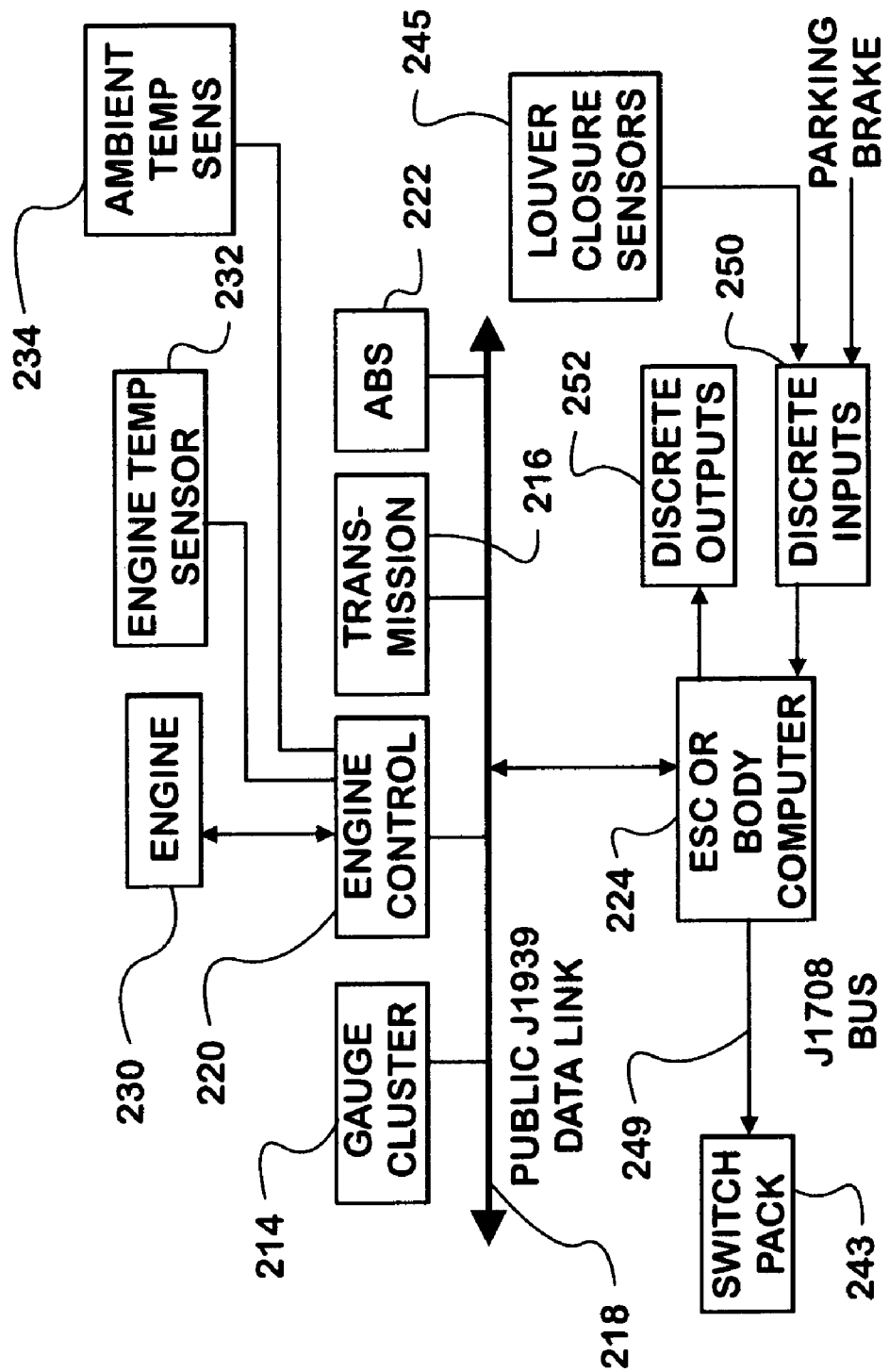
FIG. 2 is a high level schematic of the control system for the truck tractor of FIG. 1.

FIG. 2 is a simplified schematic of a control system 200 installed on truck tractor 101. While in its basic form the invention does not require intervention of control system 200, the control system 200 may be used to monitor operation of the louvers. Control system 200 is built around a public SAE J1939 compliant data bus 218 to which are connected a body computer (ESC) 224, an engine controller 220, a gauge cluster controller 214 which controls cab displays including warning indications, a transmission controller 216 and an antilock brake system (ABS) controller 222. ESC 224 is also independently connected to supply and receive discrete outputs 252 and discrete inputs 250. ESC 224 may also be connected to a switch pack 243 over an SAE J1708 bus. For purposes of the present invention it is assumed that sensors 245 indicating whether a particular louver is open or closed are connected to ESC 224 as discrete inputs 250. Louver position sensor 245 inputs can also be connected to the ESC 224 as part of a switch pack 243 with status communicated over the J1708 bus 249. Any one of the engine controller 220, the transmission controller 216 or the ABS controller 222 can be adapted to provide a vehicle speed signal. The engine controller 220 operates to control an engine 230, and monitors one or more temperature sensors which relate to engine operating temperature (e.g. coolant temperature). Temperature sensor 234 provides a reading relating to ambient temperature (e.g. an air intake temperature sensor) already provided on the vehicle to the engine controller 220.

Figure 3:
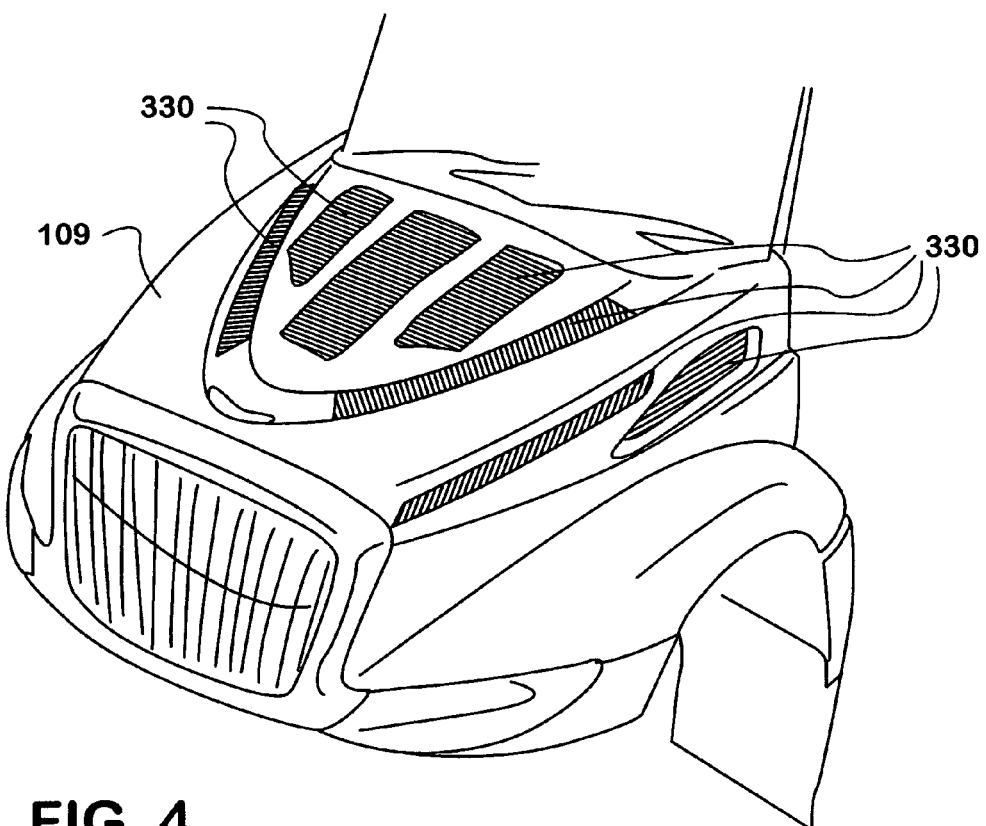
FIG. 3 is a perspective view of the truck tractor hood illustrating a symmetric positioning of vents and louvers.
Figure 4:
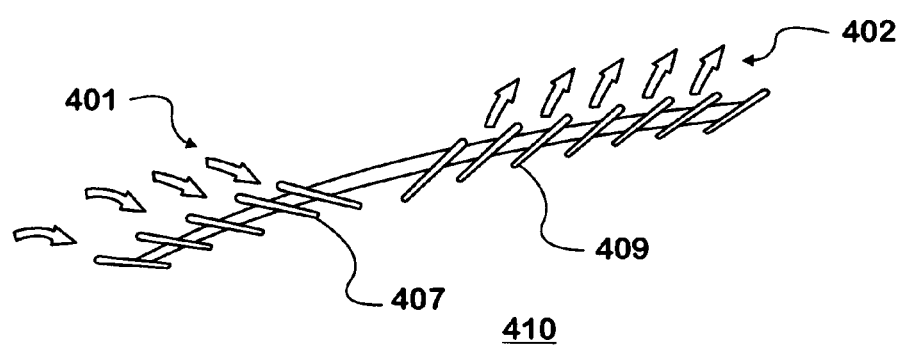
FIG. 4 is a cross sectional view of a possible arrangement of louvers to support air intake as well as exhaust.

FIG. 3 is a perspective view of a truck tractor hood 109 illustrating a symmetric distribution of vents 330 including positionable louvers according to the invention. As shown in FIG. 4, fins 407 and fins 409 of inlet and outlet louver systems 401, 402 may be constructed to admit air or to allow exhaust of air from an engine compartment 410.

Figure 5A:
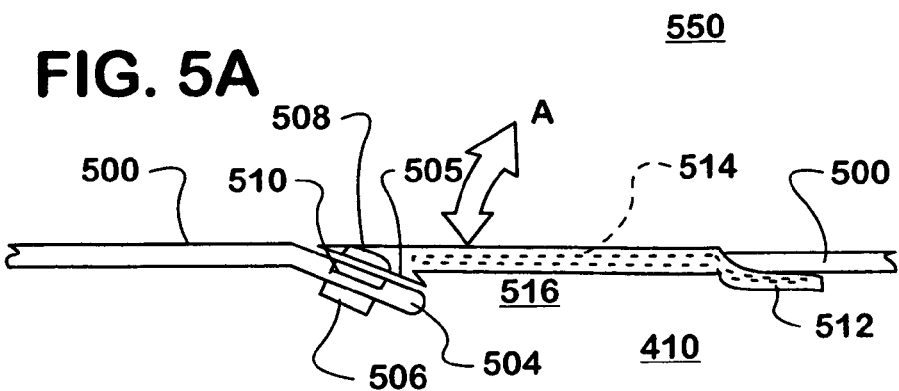
FIGS. 5A-B illustrate the louver of the present invention.
Figure 5B:
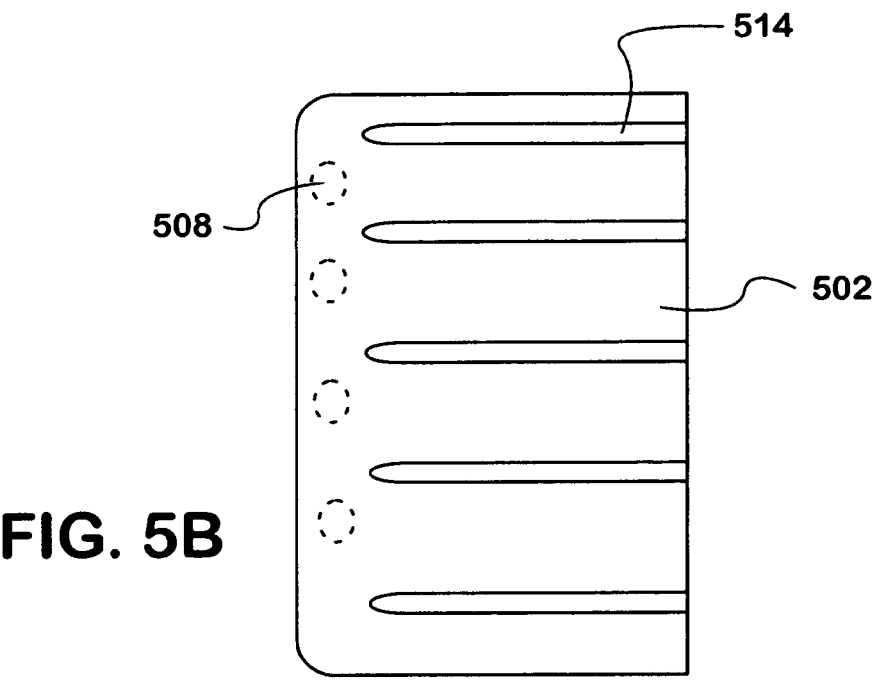

FIGS. 5A-B illustrate construction of a preferred embodiment of a fin 502 for a louver system in which the fin flexes into and out of closed and open positions as indicated by double arrow A. Alternatively, fin 502 could be mounted on a pivot. Fin 502 is mounted in a hood or body section 500 as an aerodynamic shell around an engine compartment 410. Fin 502 is affixed to hood 500 along one edge, illustrated as a section 512 which bends under hood 500. The opposite edge 505 of fin 502 is beveled to make sealing contact with a inwardly turned border 504 of hood 500 adjacent vent hole 516. Set in or affixed to inwardly turned border 504 is a permanent magnet 506. Set in beveled edge 505 of fin 502 opposite magnet 506 is a second magnet 508 oriented so that magnets 506 and 508 present opposite poles to one another for attraction. Intermediate to magnets 506 and 508 is a magnetic catch 510, which a made of a material exhibiting high magnetic susceptibility at normal atmospheric temperatures but which has a relatively low Curie point selected so that the magnetic catch 510 loses susceptibility at the desired temperature. The material of the catch 510 is selected or blended to exhibit a Curie point which corresponds to a level at which local cooling of engine compartment 410 is required. With loss of susceptibility magnetic flux is not transmitted through catch 506 with an accompanying loss of attractive force between the two permanent magnets 506, 508.

Fin 502 is flexible and incorporates springs 514 which urge the fin to curl open in the outward direction of arrow A. Springs 514 may be bimetallic so that the force urging the fin 502 open increases with increasing temperature. When temperature catch 510 regains its high susceptibility, the fin 502 is pulled closed by magnetic attraction. Where springs 514 are bimetallic, they may be designed to contribute to this operation. FIG. 5B illustrates fin 502 from a top view illustrating the lateral distribution of springs 514 along the fin and placement of magnets 508 along on edge thereof. Fin 502 may also be made of a material have shape memory which becomes pliable at elevated temperatures to ease opening of the fin but countering action of the springs when the material cools and return to its "remembered" shape.

Figure 6:
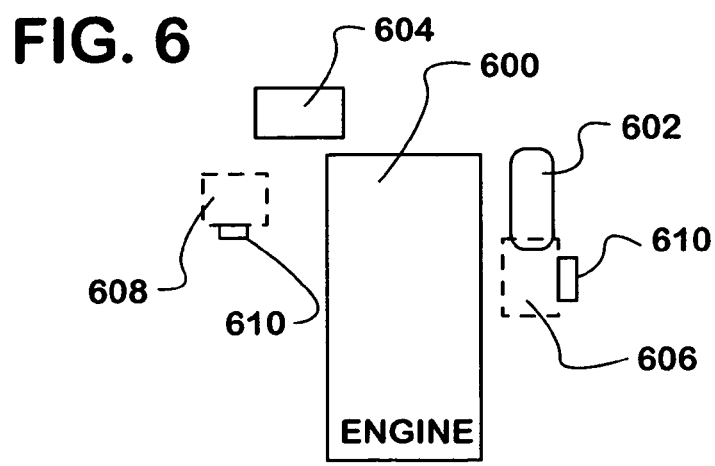
FIG. 6 is a schematic illustration of an engine compartment illustrating possible distribution for louvers of the invention.

FIG. 6 is a schematic illustration of how vents 606 and 608 might be positioned for cooling of particular accessories installed with an engine 600. Accessory 602 may be a supercharger compressor. Vent 606 is located behind the compressor 602 allowing air flowing over the compressor an outlet. Whether vent 606 is open or closed by a fin is sensed by a contact sensor 610. Similarly vent 608 is located behind and to one side of an air conditioner compressor 604 with a second contact sensor 610 situated to data at opening of the vent. The signals from the sensors 610 are coupled to ESC 224. ESC 224 is also connected to determine the operating status of some accessories, such as an air conditioning compressor.

Referring to FIG. 7, a flow chart 700 illustrates a possible algorithm executed by ESC 224 utilizing fin position information. The program is driven by the contact sensors 610, which indicate whether particular vents are open (step 702). Detection of whether one or more sensors is open is made at step 704. If none are open, execution of the program moves to step 706 where the engine temperature signal is read. Elevated temperatures may be taken as an indication that one or more vents should be open. Engine temperature exceeding a level where one or more vents is expected to be open is determined at step 708. A possible problem (i.e. failure of a contact sensor to open at an elevated temperature threshold is indicated at step 710 along the YES branch from step 708. After step 710 or along the NO branch from step 708 processing returns to step 702 to poll the contact sensors again.

If one or more vents is determined to be open at step 704, the YES branch is followed to step 712 for a look up operation to determine which vent locations have opened. This information is used to determine if operating conditions are such that it would be expected that the vent be open. This may be done from simply looking at engine temperature, or additional factors may be considered.

Steps 714 through 720 are optional. In order, they provide for reading vehicle speed (step 714), reading fuel flow (step 716, possibly as an indication of engine loading or power output as an indicator of soon to increase temperature), reading ambient temperature (718) and determining if particular accessories are running (step 720). Finally engine temperature is read (step 721). The operating variables available may then be used as arguments for a look up table to generate an expected operating temperature in the vicinity of the vent which is open (step 722). For example, there may be different expectations relating to local temperature adjacent an air conditioning compressor depending on any or all of the variables considered, and thus it may be possible to predict temperature in that area. If the vent is opened in area when it is not expected to be it may be an indication that a particular component is running hotter than expected. Such comparisons of expected state with actual state are made at step 724. If the expected state is met processing returns to step 702 along the YES branch. If not, step 726 is executed along the NO branch to alert the operator before program execution loops back to step 702.

The invention provides a louver system for engine compartment cooling requiring little or no control intervention to implement. Where louver movement appears abnormal in view of engine temperature sensors an indication may be provided an operator.

While the invention is shown in only one of its forms, it is not thus limited but is susceptible to various changes and modifications without departing from the spirit and scope of the invention.

What is claimed is:

1. A louver system for a motor vehicle engine compartment comprising:

a vent through a motor vehicle hood or a vehicle body adjacent the motor vehicle engine compartment for air circulation between the motor vehicle engine compartment and ambient atmosphere;

a fin mounted with respect to the motor vehicle hood or motor vehicle body and fitting with the vent for closure of the vent;

a first magnet mounted with respect to the fin and a second magnet mounted in proximity to the vent for drawing the fin to close the vent by mutual attraction between the first magnet and the second magnets; and a catch made of a magnetic material located intermediate the first magnet and the second magnet in a location where exposed to heat from the motor vehicle engine compartment, the magnetic material having a Curie point at which the magnetic material loses magnetic susceptibility at a selected trigger temperature for opening of the fin.

2. The louver system as set forth in claim 1, further comprising:
the vent being selectively located adjacent an accessory subject to local temperature variations partially independent of engine temperature.

3. The louver system as set forth in claim 2, further comprising:
a plurality of vents and a fin fitted to each vent, the plurality of vents being located adjacent the accessory.

4. The louver system as set forth in claim 1, further comprising:
a vehicle electrical control system;
a temperature sensor coupled to the vehicle electrical control system to provide an engine temperature related temperature measurement;
a contact sensor associated with the vent and the fin for generating a contact signal indicating closure and opening of the vent by movement of the fin with means for coupling the contact signal to the vehicle electrical control system.

5. The louver system as set forth in claim 4, further comprising:
the vehicle electrical control system including programming responsive to the contact signal for comparing a state of the contact signal with the engine temperature related temperature measurement to determine if the state of the contact signal is an expected value.

6. The louver system as set forth in claim 1, further comprising:
a spring reinforcing displacement of the fin.

7. The louver system as set forth in claim 6, further comprising:
the spring being a bimetallic spring with a relaxed shape which is a function of its temperature.

8. The louver system as set forth in claim 1, further comprising:
the fin being made of a material having shape memory.

9. A motor vehicle body comprising:
a plurality of vents located through the motor vehicle body, including a hood, adjacent an engine compartment;
a plurality of fins or louvers positioned relative to the plurality of vents for closing the plurality of vents to air circulation;
a magnetic closure system associated with at least one of the plurality of vents and a fin or louver for that at least one of the plurality of vents, the magnetic closure system including first and second magnets positioned to draw an edge of the fin into closing contact with the motor vehicle body along one edge of the at least one of the plurality of vents; and
a magnetic catch which releases the magnetic closure system responsive to temperature of the magnetic catch exceeding a Curie point of a material from which the magnetic catch is fabricated.

10. The motor vehicle body as set forth in claim 9, further comprising:
each of the plurality of vents and associated fins having a magnetic closure system and associated magnetic catch, the plurality of vents being located proximate to temperature sensitive regions under the motor vehicle body.

11. The motor vehicle body as set forth in claim 10, further comprising:
a spring associated with each fin for urging the fin to a position opening associated vents.

12. The motor vehicle as set forth in claim 11, further comprising:
the springs being bimetallic to alternatingly urge an associated fins open or closed as a function of temperature.

* * * * *